(12) United States Patent
Schmitt et al.

(10) Patent No.: US 10,576,885 B2
(45) Date of Patent: Mar. 3, 2020

(54) AIR INLET DEVICE FOR A COOLING DEVICE OF AN ELECTRIC VEHICLE

(71) Applicant: Dr. Ing. h.c. F. Porsche Aktiengesellschaft, Stuttgart (DE)

(72) Inventors: Stefan Schmitt, Leonberg (DE); Carsten Gürtler, Karlsbad (DE); Joachim Steidle, Hüttlingen (DE); Tobias Hillers, Gerlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/177,885

(22) Filed: Nov. 1, 2018

(65) Prior Publication Data

US 2019/0176694 A1 Jun. 13, 2019

(30) Foreign Application Priority Data

Dec. 8, 2017 (DE) .................. 10 2017 129 245

(51) Int. Cl.
| | |
|---|---|
| *B60Q 5/00* | (2006.01) |
| *B60R 19/48* | (2006.01) |
| *B60R 21/34* | (2011.01) |
| *B60L 58/26* | (2019.01) |
| *B60R 11/02* | (2006.01) |

(52) U.S. Cl.
CPC ............. *B60Q 5/00* (2013.01); *B60L 58/26* (2019.02); *B60R 11/0217* (2013.01); *B60R 19/48* (2013.01); *B60R 21/34* (2013.01); *B60R 2019/486* (2013.01); *B60Y 2200/91* (2013.01)

(58) Field of Classification Search
CPC .... B60Q 5/00; B60Q 5/06; B60Q 1/50; B60L 58/26; B60R 11/0217

USPC ....................................................... 340/463
See application file for complete search history.

(56) References Cited

U.S. PATENT DOCUMENTS

| 880,739 A | 3/1908 | Johnson | |
|---|---|---|---|
| 9,834,087 B2* | 12/2017 | Aoki | B60K 11/08 |
| 10,110,981 B2* | 10/2018 | Kenaley | B32B 5/02 |
| 2007/0205043 A1* | 9/2007 | Krueger | F01N 1/065 |
| | | | 181/206 |
| 2012/0081222 A1* | 4/2012 | Tamaki | B60Q 5/00 |
| | | | 340/466 |
| 2012/0085512 A1* | 4/2012 | Graaf | B60H 1/00278 |
| | | | 165/51 |

(Continued)

FOREIGN PATENT DOCUMENTS

| DE | 102006010558 A1 | 9/2007 |
|---|---|---|
| DE | 102013213543 A1 | 1/2014 |

(Continued)

OTHER PUBLICATIONS

German Examination Report for German Application No. 10 2017 129 245.4, dated Jul. 26, 2018—9 pages.

*Primary Examiner* — Eric Blount
(74) *Attorney, Agent, or Firm* — RatnerPrestia

(57) ABSTRACT

An air inlet device for a cooling device of an electric vehicle, having an air inlet duct with a duct wall delimiting a duct volume and at least one duct opening for the admission of ambient air for guiding to the cooling device. An acoustic device for pedestrian protection is arranged in the duct wall in a flow-neutral manner with respect to the flow of ambient air, with a speaker device for generating a protective noise.

10 Claims, 3 Drawing Sheets

(56) References Cited

U.S. PATENT DOCUMENTS

| | | | |
|---|---|---|---|
| 2014/0015654 A1* | 1/2014 | Nakayama | B60Q 5/00 340/425.5 |
| 2014/0283691 A1* | 9/2014 | Furuuchi | B01D 71/36 96/12 |
| 2016/0368364 A1 | 12/2016 | Aoki | |
| 2017/0151907 A1* | 6/2017 | Sakamoto | B60Q 5/006 |
| 2018/0126841 A1 | 5/2018 | Vacca | |

FOREIGN PATENT DOCUMENTS

| | | |
|---|---|---|
| DE | 102014207917 A1 | 2/2015 |
| EP | 0674097 A1 | 9/1995 |
| EP | 2540600 A1 | 1/2013 |
| EP | 2783844 A1 | 10/2014 |
| WO | 2016192984 A1 | 12/2016 |

\* cited by examiner

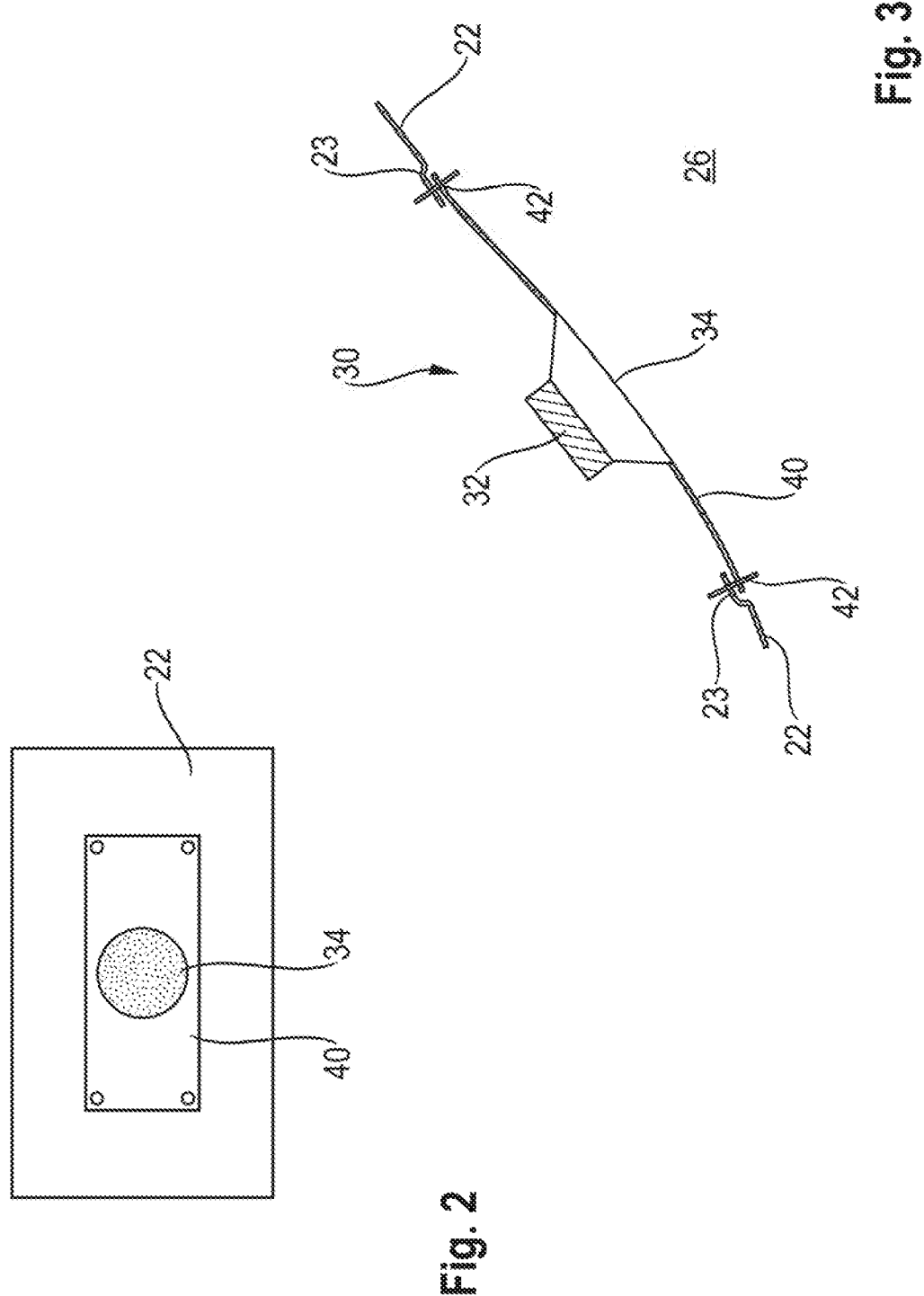

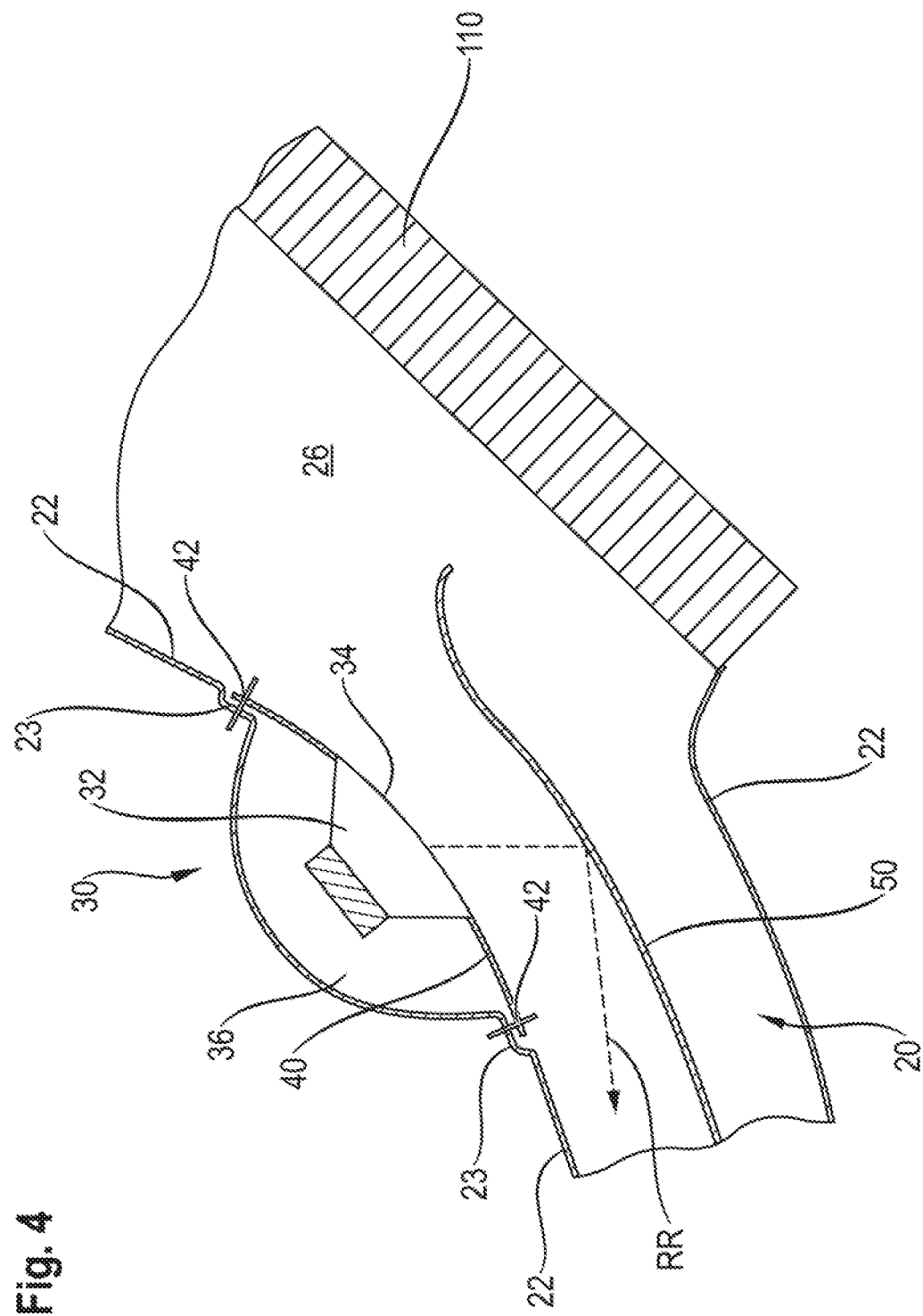

AIR INLET DEVICE FOR A COOLING DEVICE OF AN ELECTRIC VEHICLE

CROSS-REFERENCE TO RELATED APPLICATION

This application claims priority to German Patent Application No. DE 10 2017 129 245.4, filed Dec. 8, 2017, the contents of such application being incorporated by reference herein in their entirety.

FIELD OF THE INVENTION

The present invention relates to an air inlet device for a cooling device of an electric vehicle, and to a method for pedestrian protection in the case of an electric vehicle with such an air inlet device.

BACKGROUND OF THE INVENTION

It is known that electric vehicles, i.e. vehicles with an electrical or at least partially electrical drive, scarcely emit noises in the electrical mode of operation. This has the effect that, in particular during slow travel, there is an additional risk to pedestrians in the surroundings since said pedestrians are not warned about the vehicle by the otherwise customary engine noises. In order to counter this problem, it is known that electric vehicles are provided with speaker devices in order to generate protective noises which take on said warning function. Known speaker devices are customarily installed in the front portion of the vehicle.

However, the disadvantage of the known solutions is that, in order to reduce the coefficient of drag, i.e. in order to reduce the air resistance of the vehicle, the front portion of electric vehicles should customarily be configured to be mostly solid. However, this prevents an arrangement of a speaker device which requires unobstructed propagation of sound in the front region of the vehicle. In the known solutions, either a relatively high outlay has to be made in order to position relatively large speaker devices at corresponding positions in the front region of the vehicle, or else the design freedom for the front portion of the vehicle is reduced by the acoustic specifications of the speaker device.

SUMMARY OF THE INVENTION

It would be desirable to at least partially eliminate the disadvantages described above. In particular, it would be desirable to achieve pedestrian protection in a cost-effective and simple manner with a protective noise and a high degree of design freedom of the front portion of the vehicle.

Features and details which are described in conjunction with the air inlet device according to aspects of the invention also apply, of course, in conjunction with the method according to aspects of the invention and vice versa in each case, and therefore reference is or can be made constantly from one to the other in respect of the disclosure of the individual aspects of the invention.

According to aspects of the invention, an air inlet device is provided for a cooling device of an electric vehicle. Said air inlet device has an air inlet duct with a duct wall delimiting a duct volume. Furthermore, the air inlet duct is also provided with at least one duct opening for the admission of ambient air for guiding to the cooling device. An acoustic device for pedestrian protection is arranged in the duct wall in a flow-neutral manner with respect to the flow of ambient air. The acoustic device is provided with a speaker device for generating a protective noise.

It is a concept according to aspects of the invention to combine an acoustic device having the speaker device for generating the protective noise with the air inlet device for the cooling device of the electric vehicle. Electric vehicles customarily have cooling devices in order to provide a cooling functionality at high power outputs of a battery device. Customarily, cooling takes place here by means of a throughflow of ambient air, in order to discharge the waste heat, which is picked up and transported away from the battery device, into the ambient air and to conduct same out of the vehicle again. Ambient air is frequently picked up in the front portion or in the front region of the electric vehicle and can be led through there via corresponding duct openings. In a manner according to aspects of the invention, not only the primary function of guiding the ambient air to a cooping device, but also, as a secondary function, generating the protective noise are now also implemented at the same time in the known air inlet devices. This has the effect that, in a union of functions, individual components, as it were, in particular the air inlet duct, can be used in a dual manner both for air conduction and for outputting the protective noise from the electric vehicle. This leads to a reduction in the complexity of the vehicle, on the one hand, and to the reduction of weight and costs for the production of the vehicle, on the other hand.

In order to ensure that the additional functionality for generating the protective noise only minimally, if at all, affects the aerodynamics within the air inlet devices, the acoustic device is embedded in the duct wall. This embedding takes place in a flow-neutral manner, i.e. without or only with minimal influencing of the ambient flow within the duct volume of the air inlet duct. This therefore means that the acoustic devices, and in particular also the speaker device, extends along the duct wall or even forms part of the duct wall.

By virtue of the fact that the air inlet device now basically has to be present in order to ensure that ambient air is picked up in the front portion of the vehicle for cooling by means of the cooling device, the sound of the protective noise can now emerge from the inlet device in the reverse direction through the same duct opening. The duct opening of the air inlet duct thus simultaneously becomes the duct outlet for the outlet of the protective noise generated by the speaker device.

By means of the above-described combination between the acoustic device, on the one hand, and the air inlet duct, on the other hand, a high degree of design freedom in the front portion of the vehicle can be maintained. It is no longer necessary to take into consideration separate outlet regions or separate outlet openings for the discharging of the generated protective noise. The high degree of creative freedom leads here in particular to improved capability of designing the electric vehicle in respect of its air resistance, but also to a greater degree of freedom from a design point of view.

The cutout in the duct wall that is provided for the acoustic device or the speaker device can have substantially any desired form here. However, from a flow and also from an acoustic view, it is preferred if the speaker device or the acoustic device is arranged in a circular or round cutout within the duct wall of the air inlet duct. The additional function of generating the protective noise without affecting the cooling power of the cooling device can therefore be provided with the air inlet device in a combined manner.

It can likewise be of advantage here if, in the case of an air inlet device according to aspects of the invention, the acoustic device has a sealing element, in particular a sealing membrane, which separates the speaker device from the duct volume and is of acoustically permeable and liquid-tight design. Such a sealing element serves firstly for protecting the speaker device against matter which may penetrate the air inlet duct. Due to the fact that the air inlet duct is substantially open to the surroundings of the vehicle via the duct opening, there is fundamentally the risk of the penetration of liquid, for example in the case of damp weather. In order now to avoid liquid having a negative effect on the electrics or other technical components of the speaker device or of the acoustic device, a corresponding protective function can be provided with the aid of a sealing element, in particular with a sealing membrane which covers an area portion of the acoustic device or of the speaker device. In order to ensure that, despite the presence of the sealing element or of the sealing membrane, the protective noise generated by the speaker device also passes in the predetermined manner via the air inlet duct and the duct opening into the surroundings, said sealing membrane or the sealing element is configured to be acoustically permeable. A particularly advantageous embodiment can make provision for the corresponding sealing functionality according to this embodiment to be provided even if the sealing membrane is part of the speaker device, i.e. the part of the speaker device which is located in the region of the duct volume.

A further advantage can be achieved if, in the case of an air inlet device according to aspects of the invention, the acoustic device has a free acoustic volume which at least partially surrounds the speaker device on the rear side. The rear side of the speaker device should be understood here as meaning the acoustically inactive side which is therefore directed away from the acoustically active side, from which the protective noise is discharged in the case of the speaker device. In this embodiment, an acoustic volume which is delimited in particular by acoustic volume walls or walls is now provided in the acoustic device on said rear side. The acoustic volume here is preferably configured within a range of more than approximately 3 l, but not to be excessively large, preferably within a range of less than approximately 5 l. To make this acoustic volume available, it may be advantageous to provide a corresponding structural space above or behind the duct wall. With the aid of the acoustic volume, it is now possible to provide a geometrical amplification, as it were, of the sound and therefore to use smaller speaker devices. Therefore, by means of an empty or free acoustic volume, the entire weight, the costs and the required space for an air inlet device according to the present invention in an electric vehicle can be reduced.

It can likewise be of advantage if, in the case of an air inlet device according to aspects of the invention, the speaker device is arranged and/or accommodated in a mounting plate which is fastened by means of a mounting intersection, in particular in a water-tight manner, to a mating mounting intersection of the duct wall. It can readily be seen here how the mounting capability can be provided in a particularly simple and cost-effective manner. The speaker device can be designed here as a preassembled module part of the mounting plate or can be fastened to the mounting plate. In particular, the mounting plate can also already be provided with the sealing element or the sealing membrane which has already been explained, and therefore the latter can likewise be part of said module. The fastening between the mounting intersection and the mating mounting intersection can be provided both reversibly and in an irreversible manner. A reversible fastening makes it possible to also undertake disassembly retrospectively for maintenance work or for exchanging defective speaker devices. In order to be able to design the contact between the mounting intersection and the mating mounting intersection to be water-tight, a sealing element, for example a sealing ring, which can also be referred to as an O-ring, can likewise be used here.

Further advantages can be afforded if, in the case of an air inlet device according to aspects of the invention, the mating mounting intersection is an offset in the duct wall that corresponds or substantially corresponds to the thickness of the mounting intersection for an edge-free and/or low-edge transition between the duct wall and the mounting plate. It should be understood by this that a geometrical reception, as it were, or an at least partially formed geometrical form fit can take place between the mounting intersection and the mating mounting intersection. As soon as the mounting plate is therefore in the mounting position and the mounting intersection is fastened to the mating mounting intersection, the surface of the mounting plate, as it were, continues the inner surface of the duct wall in an edge-free or low-edge manner. The thickness of the mounting plate should be understood here as meaning the orientation transversely or perpendicularly to the flow direction in this portion of the air inlet duct. The offset is in particular provided around the full circumference or in an encircling manner around the corresponding receiving opening in the duct wall for the mounting plate. It is also conceivable for a seal or a groove for receiving an additional seal to be provided in the offset.

It is likewise of advantage if, in the case of an air inlet device according to aspects of the invention, a reflection element for reflecting the protective noise in the direction of the duct opening is arranged in the duct volume. The use of an acoustically active element in the form of the reflection element makes it possible to permit greater freedom in the mounting positioning and in particular also even in the structural configuration of the positioning of the acoustic devices. A protective noise which would possibly not pass or would pass only to a small extent into the surroundings of the vehicle without such a reflection element can thus also be reflected by the reflection element in the direction of the duct opening. The greater degree of freedom for the positioning of the acoustic device and in particular also in respect of the orientation of the speaker device leads to increased structural freedom in the configuration of the entire front portion of the electric vehicle and improves the advantages which are achievable according to aspects of the invention even further.

In the case of an air inlet device according to the above paragraph, it is advantageous if the reflection element has a plate-like design and extends or substantially extends in particular along a flow direction of the guided ambient air. A plate-like design should be understood as meaning a configuration with a flat thickness and a significantly greater extent in the two other dimensional directions. The plate-like design here can include a flat design, but also curved or multiply curved plate-like designs are also conceivable within the context of the present invention. In particular against the background that the air inlet devices and in particular the air inlet duct customarily has a curved profile, and therefore the existing flow direction of the ambient air that is curved via said profile is changed, an adaptation of said plate-like design to said curved profile is advantageous. The plate-like design can preferably lead here to a plate-like connection of the reflection element to the lateral duct walls of the air inlet duct also being provided.

Furthermore, advantages are afforded if, in the case of an air inlet device according to the above two paragraphs, the reflection element has a reflection direction which is directed away from a cooler of the cooling device, said cooler being arranged in the duct volume. Since the primary function of the air inlet device is arranged to supply ambient air to a cooler of the cooling device, it has to be ensured that there is no mutual negative influencing of the two functions either in the one or in the other direction. Due to the fact that the cooling device is customarily provided with a cooler having cooling fins or cooling surfaces, there would be the risk of the protective noise being damped or even entirely eliminated by contact or striking against the cooler. An arrangement of the reflection element with a reflection direction away from said cooler avoids this disadvantage and significantly reduces the risk of reducing the emergence of the generated protective noise.

The present invention likewise relates to a method for pedestrian protection in the case of an electric vehicle with an air inlet device according to aspects of the invention, having the following steps:
  identifying a movement of the electric vehicle,
  generating a protective noise with the acoustic device.

By means of the use of an air inlet device according to aspects of the invention a method according to aspects of the invention affords the same advantages as have been explained in detail with respect to an air inlet device according to aspects of the invention. The method is carried out here in particular between two movement limits of the electric vehicle, namely, firstly, when the electric vehicle is at a standstill and at which no warning function is necessary and, secondly, an upper limit from which the further noises, for example wind noise or tire rolling noise, automatically constitute a protective effect.

A method according to aspects of the invention can be developed to the extent that controllable closure devices, in particular inlet flaps, in the region of the duct opening are at least partially opened during the generating of the protective noise. In order to be able to influence a vehicle flow in respect of reducing the air resistance, it is known to provide inlet devices or closure devices in order to permit the flow through the cooling device only when it is actually also necessary for the cooling function. If, however, the outputting of a protective noise is desired at a time at which the operating mode of the battery device or of the cooling device provides closed inlet flaps or closed closure devices, this could also lead to the protective effect being reduced or entirely eliminated by means of a blockade of the outlet of the protective noise by the closure devices. In order to avoid this, a method according to aspects of the invention takes into consideration the outputting of the protective noise and opens the inlet flaps or the closure device at least during the generation, in particular even before the generation, of the protective noise. In other words, the closing of the closure device for coefficient of drag values or for the corresponding temperature control requirement is overridden if a protective noise is intended to be output.

BRIEF DESCRIPTION OF THE DRAWINGS

Further advantages, features and details of the invention emerge from the description below in which exemplary embodiments of the invention are described in detail with reference to the drawings. The features mentioned here in the claims and in the description may be essential to the invention in each case individually by themselves or in any desired combination. Schematically in the drawings:

FIG. 2 shows an embodiment of a mounting plate with a speaker device, FIG. 3 shows the embodiment of FIG. 2 in a schematic cross section, and FIG. 4 shows the embodiment of FIG. 2 in enlarged schematic cross section.

DETAILED DESCRIPTION OF THE INVENTION

Figure 1:
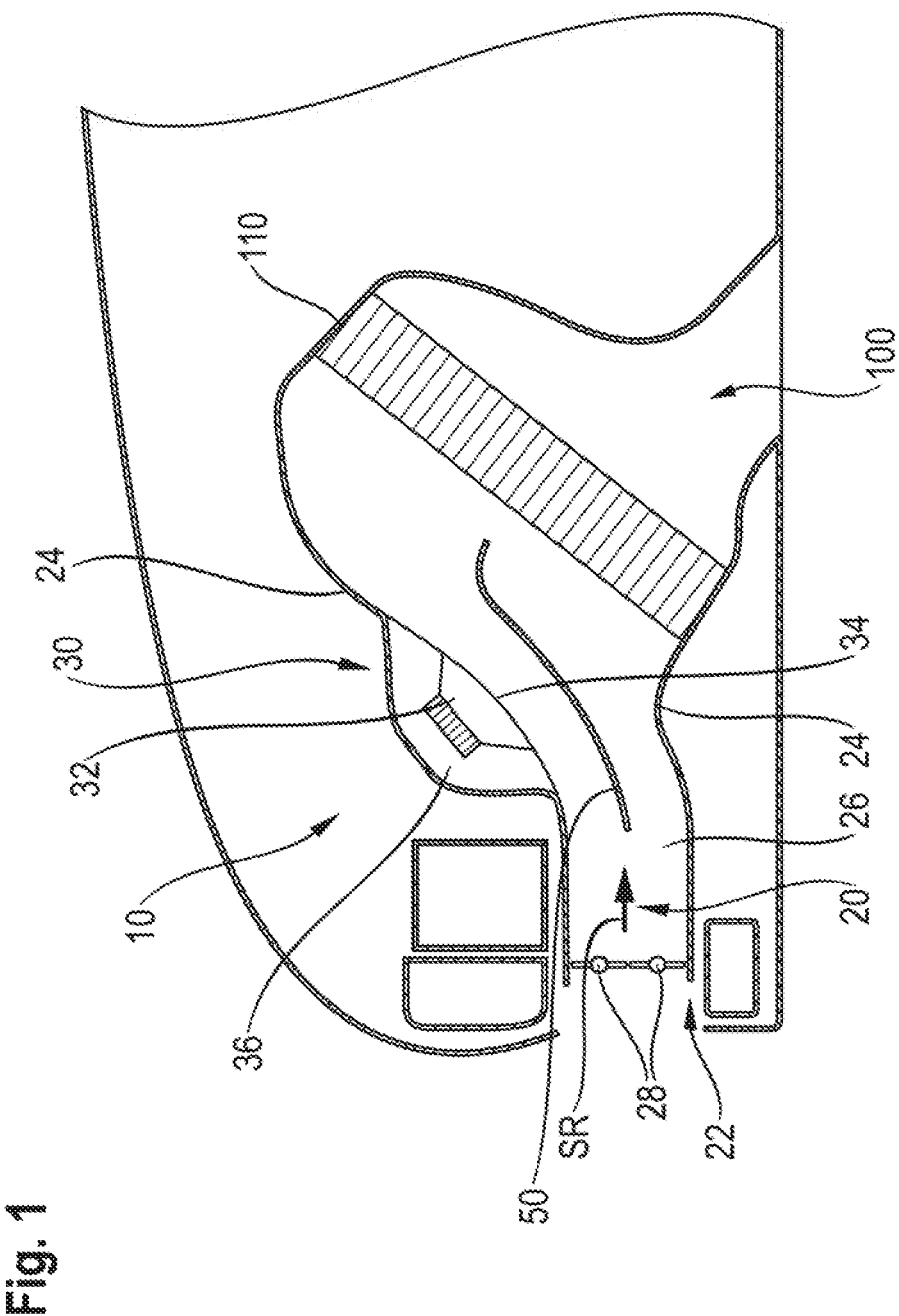
FIG. 1 shows n embodiment of an air inlet device according to aspects of the invention.

FIG. 1 schematically shows how a cooling device 100 with a cooler 110 can be arranged in an electric vehicle. In order to remove waste heat which is intended to be discharged to the surroundings from the battery device of the electric vehicle via the cooling device 100, a cooler 110 is provided here, through which ambient air is intended to flow. Said ambient air can now be guided with the aid of an air inlet device 10 via the cooler 110 and the cooling surface thereof. For this primary cooling function, the air inlet device 10 is provided with a duct opening 22 through which ambient air can flow in a duct volume 26 along a duct wall 22 into the air inlet duct 20.

The air inlet device 10 is now provided with a secondary functionality, namely generating a protective noise for pedestrian protection. For this purpose, an acoustic device 30 with a speaker device 32 is provided in the upper region of the duct wall 22, said acoustic device being capable of generating a protective noise and discharging same into the duct volume 26 of the air inlet duct 20. A reflection element 50 can likewise already be seen schematically and deflects the rearwardly directed outputting of the protective noise and reflects the protective noise in the direction of the duct opening 22 for outputting same to the surroundings around the electric vehicle.

It can readily be seen in FIGS. 2 and 3 how pre-assembly of a module can be undertaken. A mounting plate 40 is provided here, the mounting plate having a circular opening which, in turn, is configured with a sealing element 34 in the form of an acoustic, permeable and liquid-tight sealing membrane. The speaker device 32 of the acoustic device 30 is arranged on the rear side of said sealing element 34, as can be seen in the schematic cross section of FIG. 3. For the mounting of said preassembled module, the mounting intersections 42 of the mounting plate 40 can be in contact with the corresponding mating mounting intersections 23 of the duct wall 22. After the installation, the duct wall 22 extends further over the mounting plate 40 in a low-edge or edge-free manner such that this transition has been configured in a substantially flow-neutral manner. In order to be able to produce said edge-free or low-edge transition between the mounting plate 40 and the duct walls 22, the mating mounting intersection 23 is provided here with an offset from the adjacent duct wall 22 such that a correspondingly form-fitting reception of the mounting intersection 42 is possible.

It can once again be readily seen in FIG. 4 how the reflection element 50, which is oriented along the flow direction SR of the ambient air through the air inlet duct 20 according to FIG. 1, provides its reflection effect. Without the reflection element 50, discharged protective noise would pass from the speaker device 32 in the direction of the cooler 110. Owing to the fact that the reflection element 50 is now arranged in the duct volume 26 of the air inlet duct 20, a reflection direction RR for the protective noise is provided in the direction of the duct opening 22.

The presence of an acoustic volume 36 on the rear side of the speaker device 32 can furthermore also be gathered from FIG. 4. Said acoustic volume is bounded on the one side by a corresponding acoustic wall and on the duct side by the mounting, plate 40 and is configured in particular within the range of between approximately 3 I and approximately 5 I. The acoustic volume 36 serves for mechanically or geometrically amplifying the protective noise which can be generated by the speaker device 32.

The above explanation of the embodiments describes the present invention exclusively within the scope of examples. Of course, individual features of the embodiments, if technically expedient, can be freely combined with one another without departing from the scope of the present invention.

What is claimed is:

1. An air inlet device for a cooling device of an electric vehicle, the air inlet device comprising:
   an air inlet duct with a curved duct wall delimiting a duct volume and at least one duct opening for admitting and guiding ambient air to the cooling device, and
   an acoustic device for pedestrian protection arranged in the curved duct wall in a flow-neutral manner with respect to the flow of ambient air, with a speaker device for generating a protective noise, wherein the acoustic device has a sealing element, in the form of a sealing membrane, which separates the speaker device from the duct volume, and the sealing element is shaped to follow a curvature of the curved duct wall, and wherein the speaker device is arranged or accommodated in a mounting plate, and the mounting plate is also shaped to follow a curvature of the curved duct wall.

2. The air inlet device as claimed in claim 1, wherein the sealing membrane is of acoustically permeable and liquid-tight design.

3. The air inlet device as claimed in claim 1, wherein the acoustic device has a free acoustic volume which at least partially surrounds the speaker device on the rear side.

4. The air inlet device as claimed in claim 1, wherein the mounting plate is fastened by a first mount, in a water-tight manner, to a mating second mount of the duct wall.

5. The air-inlet device as claimed in claim 4, wherein the mating mount is an offset in the duct wall that corresponds or substantially corresponds to a thickness of the first mount for either an edge-free or low-edge transition between the duct wall and the mounting plate.

6. The air inlet device as claimed in claim 1, further comprising a reflection element for reflecting the protective noise in a direction of the duct opening, the reflection element being arranged in the duct volume.

7. The air inlet device as claimed in claim 6, wherein the reflection element is a plate and extends or substantially extends along a flow direction of the guided ambient air.

8. The air inlet device as claimed in claim 6, wherein the reflection element has a reflection direction which is directed away from a cooler of the cooling device, said cooler being arranged in the duct volume.

9. In an air inlet device for a cooling device of an electric vehicle, the air inlet device including an air inlet duct with a curved duct wall delimiting a duct volume and at least one duct opening for admitting and guiding ambient air to the cooling device, and an acoustic device for generating a protective noise arranged in the curved duct wall in a flow-neutral manner with respect to the flow of ambient air, wherein the acoustic device has a sealing element, in the form of a sealing membrane, which separates the acoustic device from the duct volume, and the sealing element is shaped to follow a curvature of the curved duct wall, and wherein the acoustic device is arranged or accommodated in a mounting plate, and the mounting plate is also shaped to follow a curvature of the curved duct wall, a method of protecting pedestrians located outside of the electric vehicle, said method comprising:
   generating the protective noise using the acoustic device that is either positioned within, delimits or forms part of the air inlet duct in which the cooling device of the electric vehicle is positioned, such that the protective noise travels along the sealing element and the mounting plate, through the air inlet duct and outside of the electric vehicle for alerting pedestrians to the presence of the electric vehicle.

10. The method as claimed in claim 9, further comprising at least partially opening controllable closure devices, in the form of inlet flaps, in a region of a duct opening of the inlet duct during the step of generating the protective noise.

* * * * *